Jan. 12, 1954
A. KASAK ET AL
2,665,529
GRINDING MACHINE
Filed Oct. 13, 1949
10 Sheets-Sheet 1
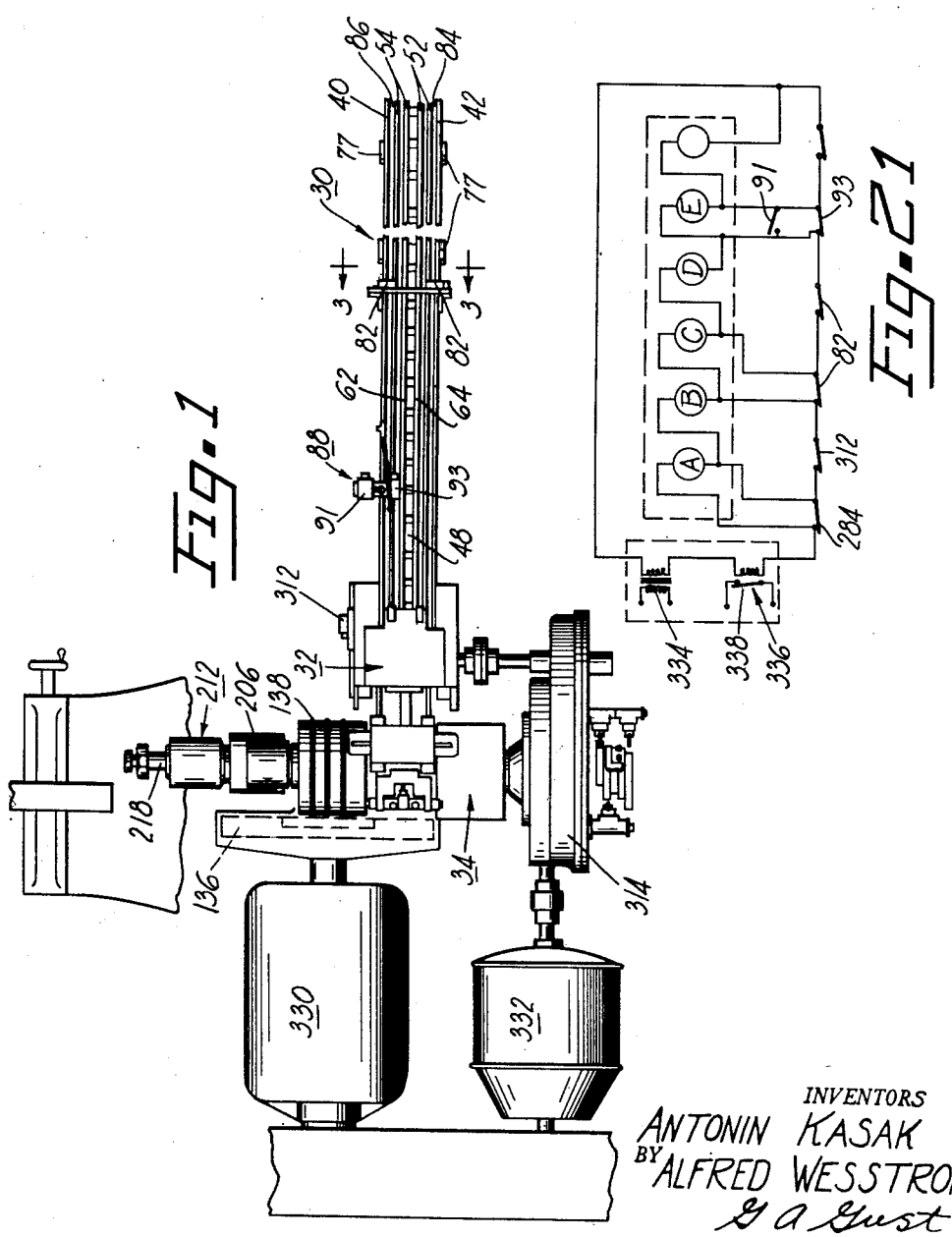
INVENTORS
ANTONIN KASAK
BY ALFRED WESSTROM
G. A. Gust
ATTORNEY

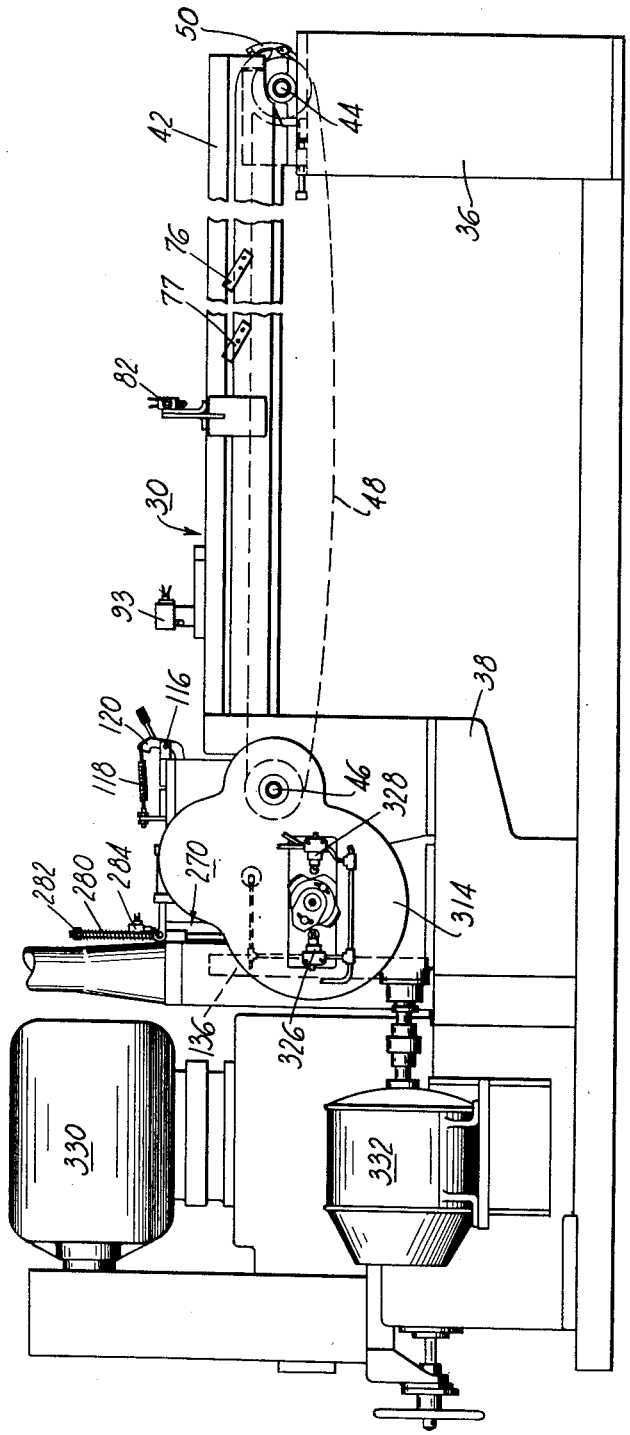

Jan. 12, 1954          A. KASAK ET AL          2,665,529
                        GRINDING MACHINE
Filed Oct. 13, 1949                          10 Sheets-Sheet 3

INVENTORS
ANTONIN KASAK
BY ALFRED WESSTROM
G. A. Gust
ATTORNEY

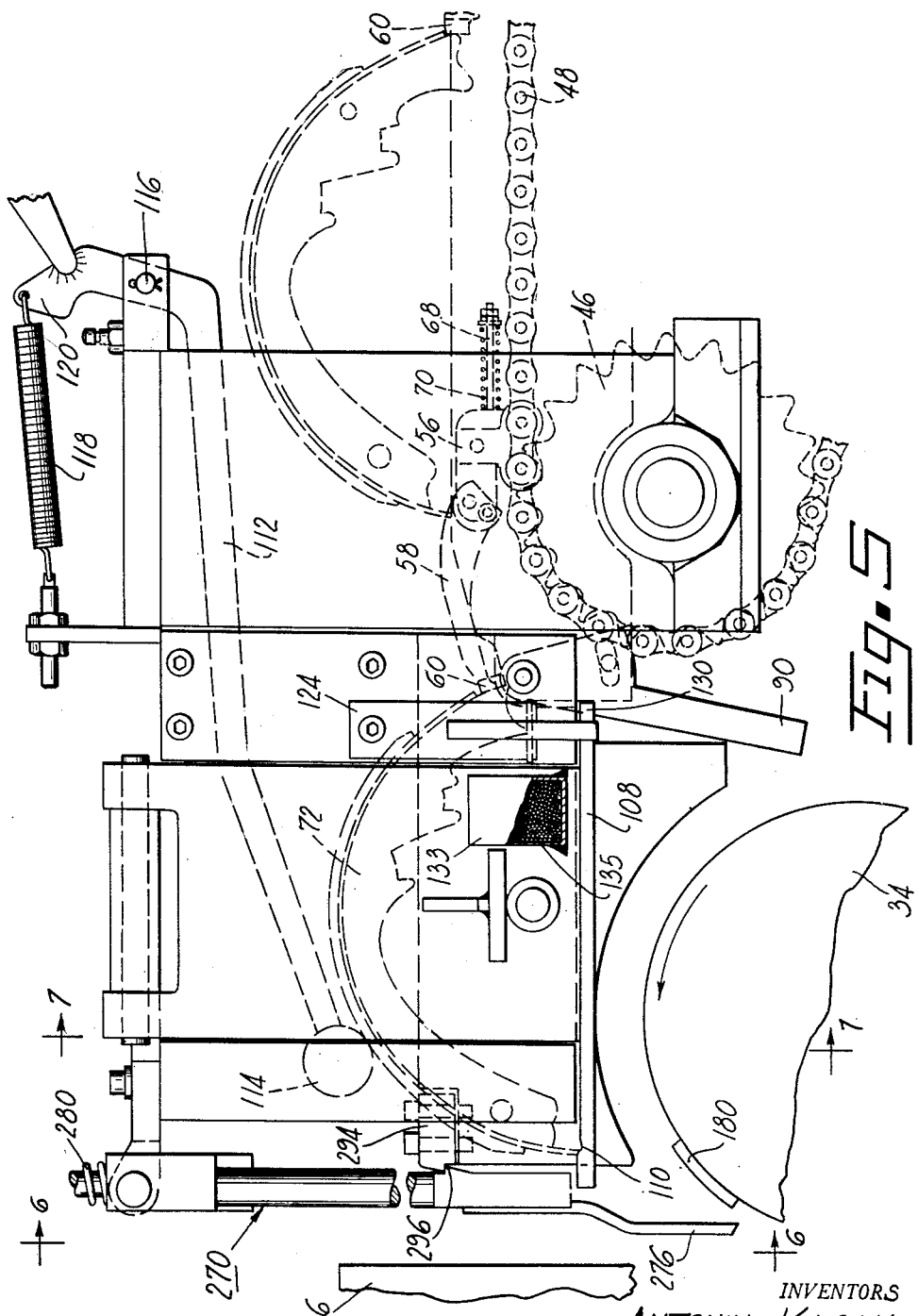

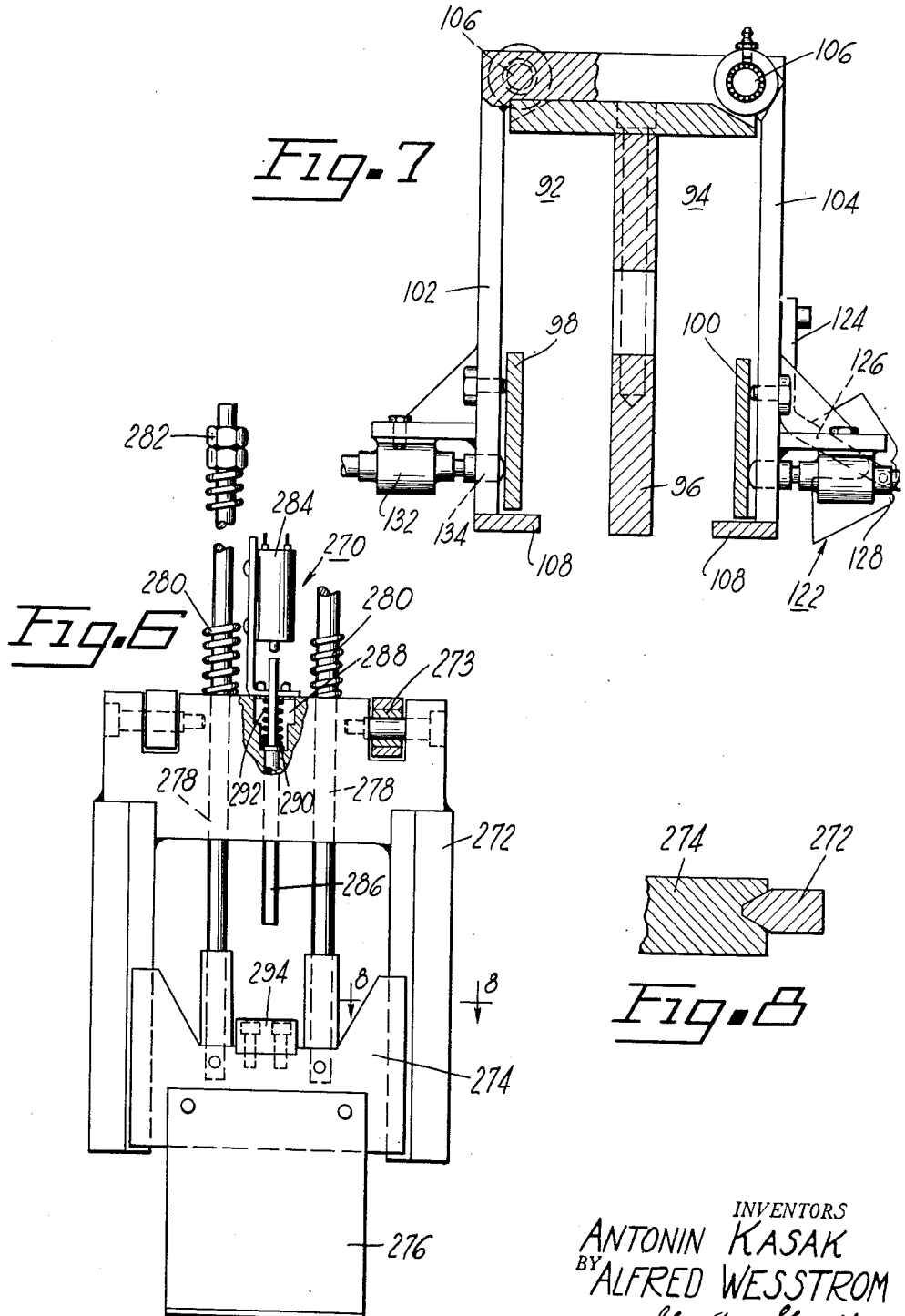
Jan. 12, 1954  A. KASAK ET AL  2,665,529
GRINDING MACHINE
Filed Oct. 13, 1949  10 Sheets-Sheet 5
INVENTORS
ANTONIN KASAK
BY ALFRED WESSTROM
G. A. Gust
ATTORNEY Jan. 12, 1954
A. KASAK ET AL
2,665,529
GRINDING MACHINE
Filed Oct. 13, 1949
10 Sheets-Sheet 6
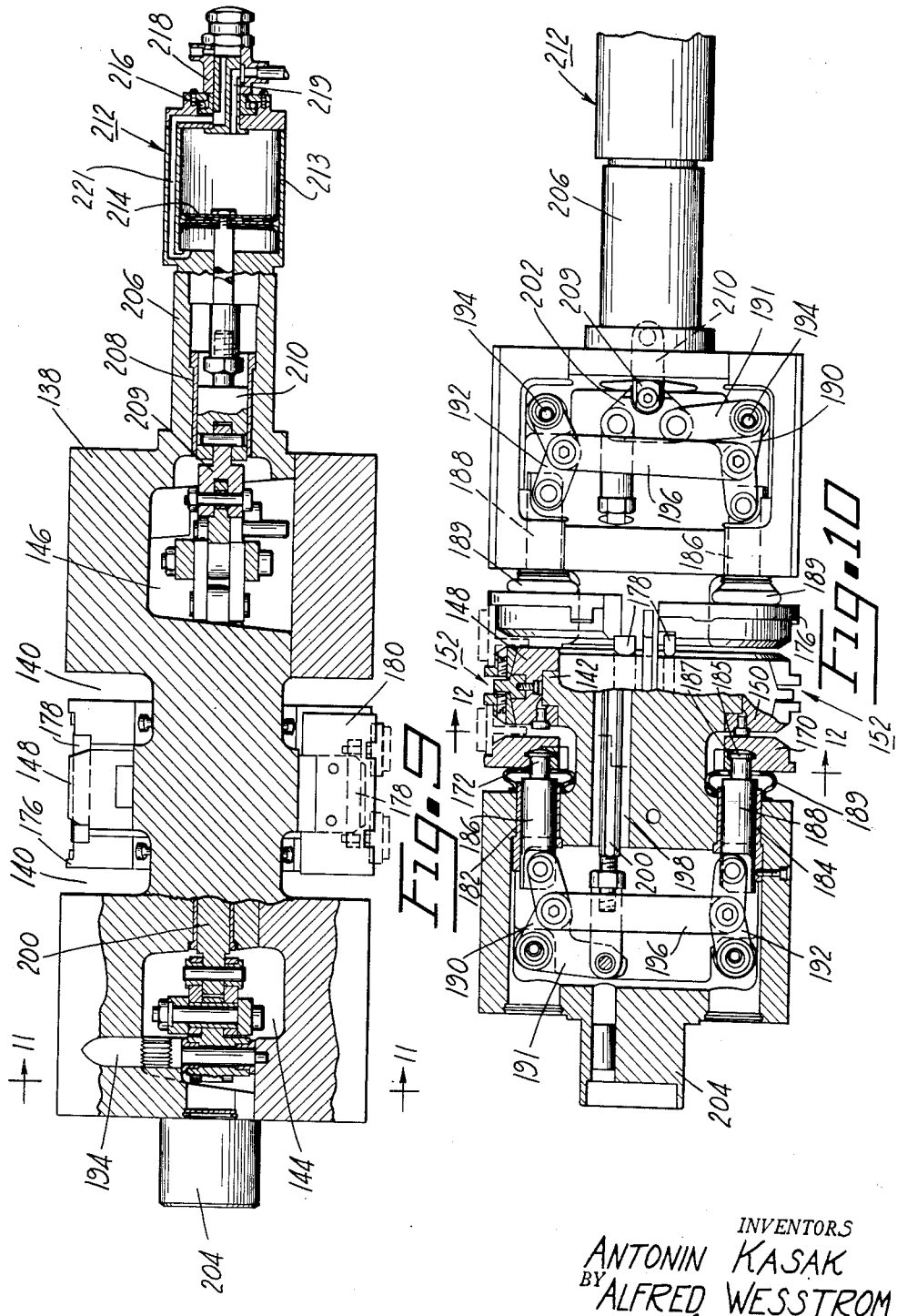
INVENTORS
ANTONIN KASAK
BY ALFRED WESSTROM
G. A. Gust
ATTORNEY

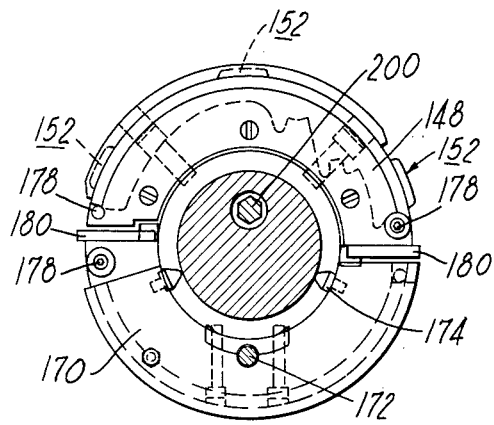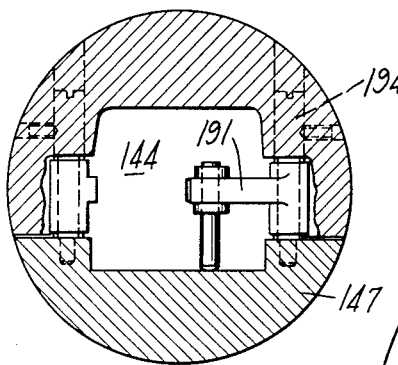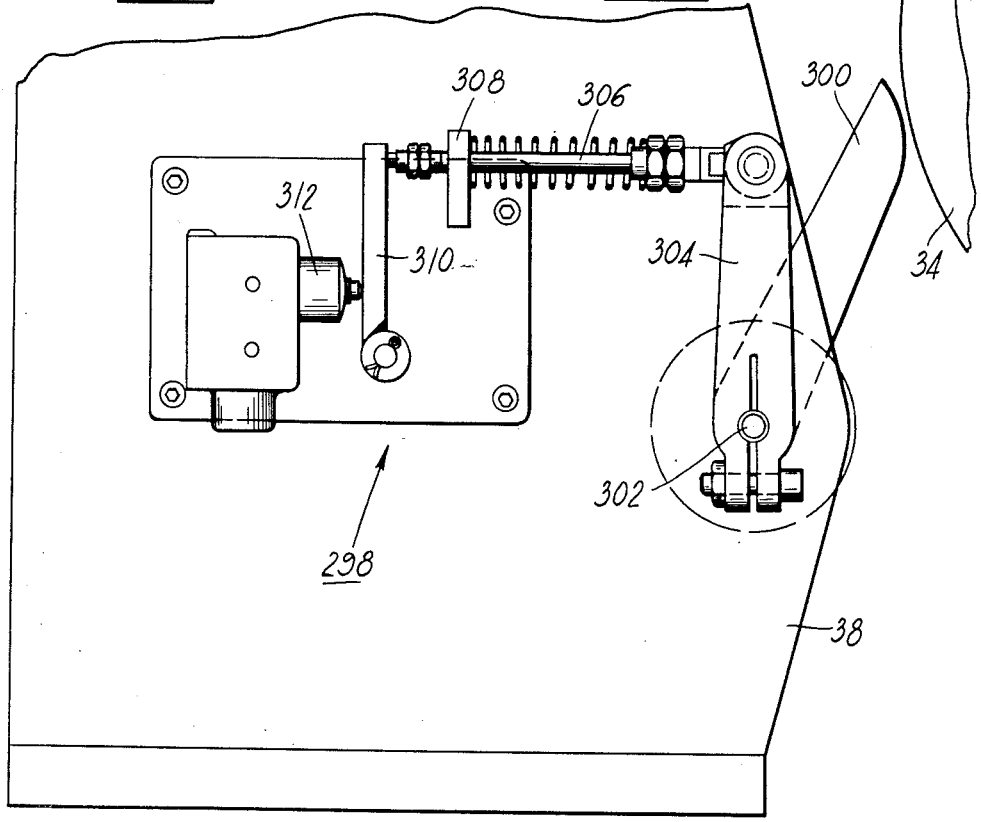

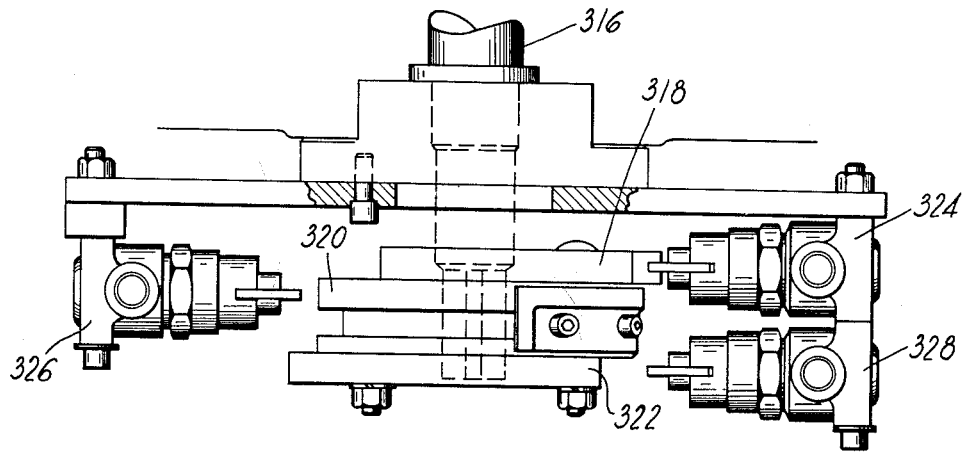
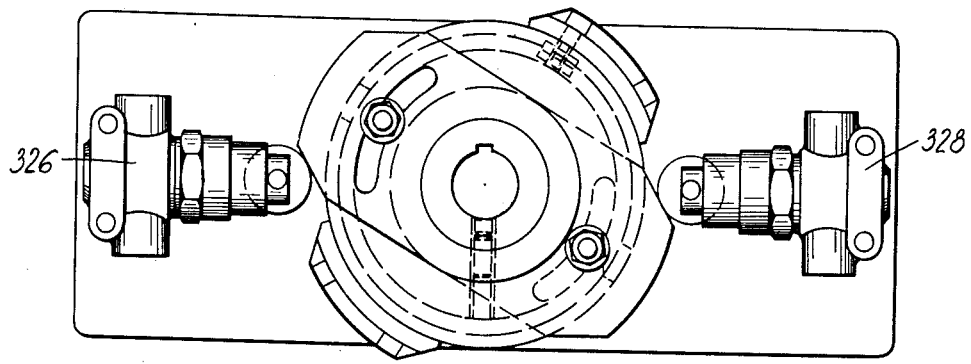
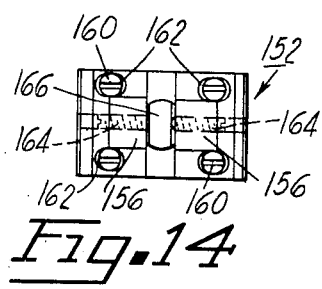
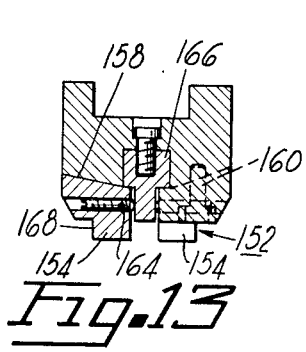

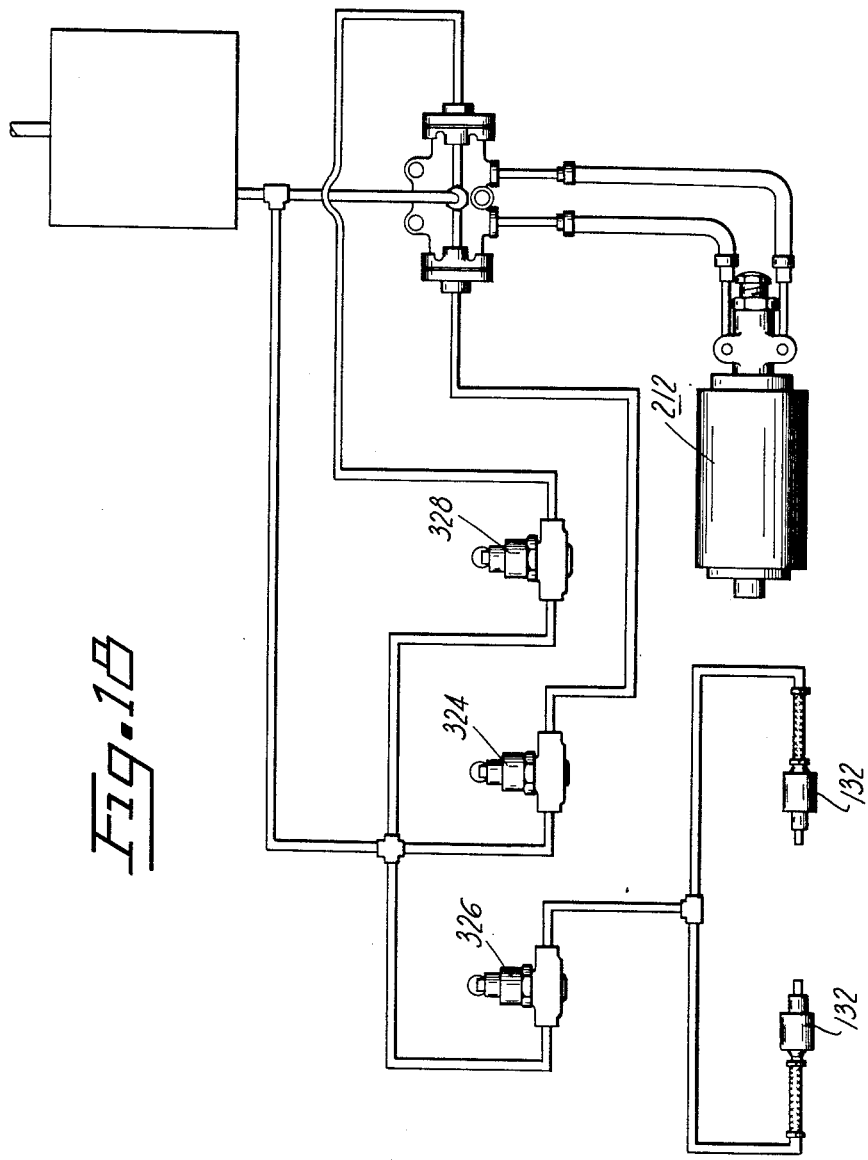

Jan. 12, 1954
A. KASAK ET AL
2,665,529
GRINDING MACHINE
Filed Oct. 13, 1949
10 Sheets-Sheet 10
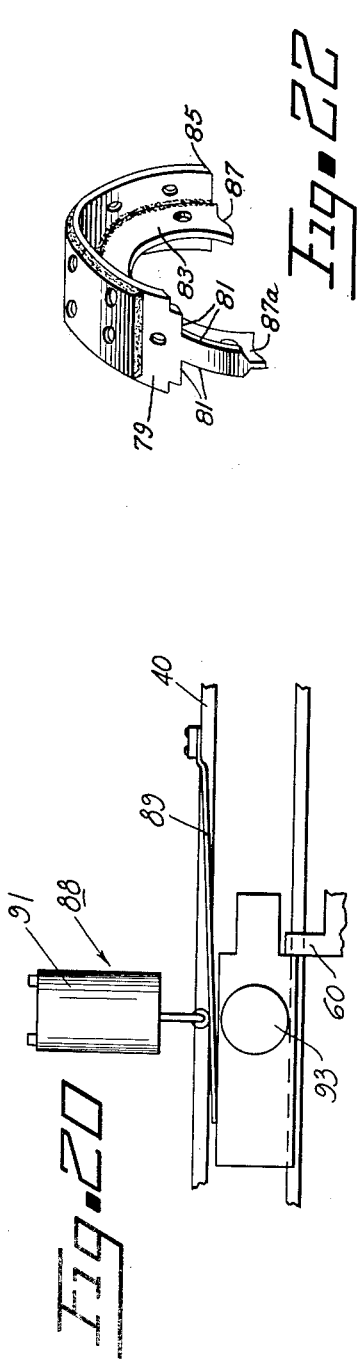
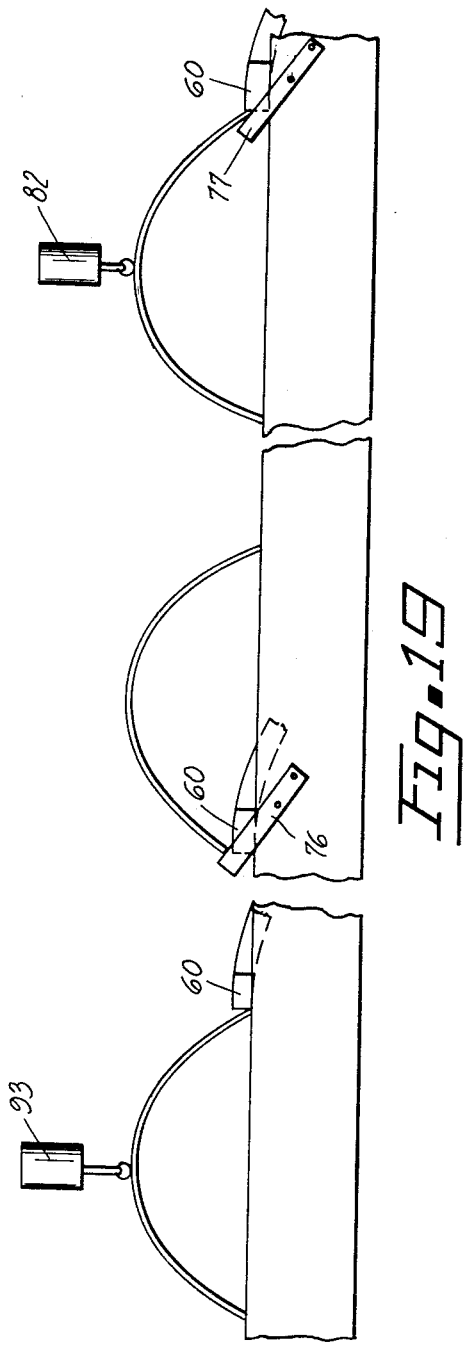
INVENTORS
ANTONIN KASAK
BY ALFRED WESSTROM
G. A. Gust
ATTORNEY Patented Jan. 12, 1954

2,665,529

UNITED STATES PATENT OFFICE 2,665,529

GRINDING MACHINE

Antonin Kasak and Alfred Wesstrom, South Bend, Ind., assignors to Bendix Aviation Corporation, South Bend, Ind., a corporation of Delaware Application October 13, 1949, Serial No. 121,112

30 Claims. (Cl. 51—215)

1

The present invention relates to grinding, and is illustrated as embodied in a novel power driven machine for grinding to decimal thickness the composition lining secured to the rim of a brake shoe.

The primary object of the present invention is to provide a reliable machine, in which the work of loading and unloading is reduced to a minimum. A particular feature of novelty in this respect is the elimination of manual loading and unloading of the rotating brake shoe clamping fixtures which carry the brake shoe into a grinding wheel.

Another object of the present invention is to provide a fully automatic grinding machine in which brake shoe assemblies are manually fed into one end of the machine with the assemblies then being automatically transported through the grinding process and delivered to a collecting conveyor or tote box.

Another object of the present invention is to provide a series of safety devices on a grinding machine which stop the machine if brake shoes are improperly positioned therein, or are of wrong size. With these devices, serious damage to the machine can be avoided, thereby eliminating costly shutdown time and maintenance.

A further object of the present invention is to provide a novel arrangement for feeding brake shoes from a conveyor line to a brake shoe clamping fixture whereby a brake shoe is guided, in loading, and then clamped preparatory to the grinding operation.

A further object is to provide a loading mechanism which is operated by fluid pressure thereby obviating undesirable mechanical connections which were susceptible to easy breakage.

A still further object is to provide a clamping fixture operable by fluid pressure whereby positive control is maintained over the clamping forces needed to hold a brake shoe in position for grinding. Another object is to provide dustproof chambers for the clamping fixture to minimize maintenance.

A still further object is to provide novel brake shoe locating means on the clamping fixture readily adjustable to compensate for manufacturing tolerances. A difficulty often encountered in setting up production machines is the fact that the tolerances on one run of articles coming through the production lines vary in size from other runs because of variations in other machine setups. In the present invention, a great deal of machine down-time is saved by this adjustable

2 feature which eliminates the necessity of forming new locating parts or reforming the old parts for each variation in brake shoe size.

Other objects and objects ancillary thereto will become apparent as the description proceeds.

In the drawings:

Figure 1 is a partial plan view of an embodiment of the present invention;

Figure 2 is a side elevation thereof;

Figure 5 is a side elevation showing the construction of the loading device, the delivering end of the conveyor, and the clamping drum in position;

Figure 6 is a view taken on section line 6—6 of Figure 5 showing one safety switch construction;

Figure 7 is a section through the loading device taken on section line 7—7 of Figure 5;

Figure 8 is a sectional view taken on section line 8—8 of Figure 6 showing the gib construction;

Figure 9 is a longitudinal section of the rotating clamping fixture or drum in combination with a rotating air cylinder which provides the clamping force;

Figure 10 is another view of the clamping drum rotated 90° to Figure 9 and shown in part section;

Figure 11 is a sectional view taken on section line 11—11 of Figure 9 showing the dust sealed cavity;

Figure 12 is a sectional view taken on section line 12—12 of Figure 10 showing a brake shoe in position;

Figure 13 is an enlarged sectional view of the adjustable locating points as viewed in Figure 10;

Figure 14 is a plan view of Figure 13;

Figure 15 is a side elevation of the timing cams and the associated valves;

Figure 16 is a plan view of Figure 15;

Figure 17 is a side elevation of a shoe discharge safety device;

Figure 18 is a diagram of the fluid system;

Figure 19 is a diagrammatic illustration of brake shoes on the conveyor;

Figure 20 is another diagrammatic illustration of a fragmental plan view of a narrow brake shoe in the wide conveyor channel passing through a safety device;

Figure 21 is an electrical circuit of the safety devices and trouble locating lamps used in the present invention; and Figure 22 is an isometric illustration of a particular brake shoe which the present invention may be designed to perform work upon.

Simply stated, the embodiment of the present invention comprises three essential structural arrangements; first the conveyor 30, second the shoe loading device 32 which is positioned at the delivering end of the conveyor, and last the rotatable clamping drum 34 which receives the brake shoe from the loading device, clamps it in a predetermined position, and carries it into the grinding wheel.

Figure 3:
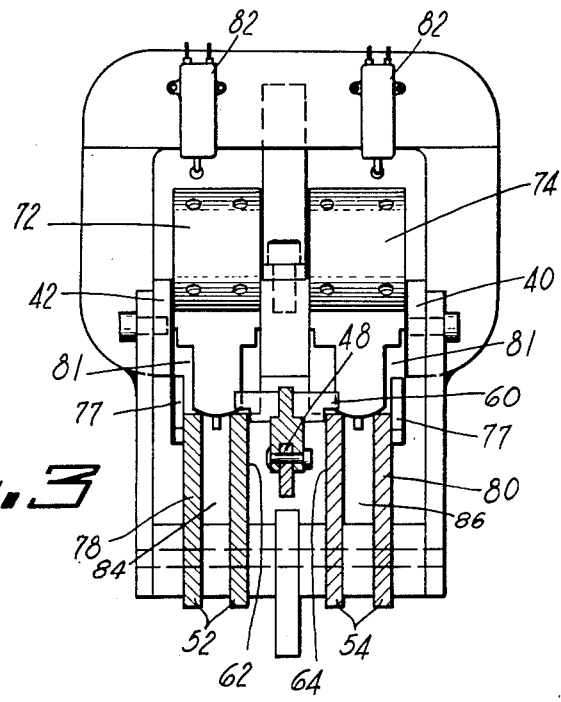
Figure 3 is a section taken on section line 3—3 of Figure 1 showing two brake shoes in position on the slide rails.

Referring to the drawings and more particularly to Figures 1 to 5, the conveyor 30 is shown supported by a frame constituted by leg members 36 and 38 and a pair of spaced longitudinally extending sides 40 and 42. Journaled on the leg members between the ends of sides 40 and 42 are sprockets 44 and 46 carrying a chain 48 upon which is mounted a plurality of equi-spaced pusher assemblies 50. As viewed in Figure 1, the chain 48 travels between the sides 40 and 42 to lie beneath and intermediate two sets of conveyor rails generally indicated by the reference numerals 52 and 54 (see Figure 3). Each set of conveyor rails 52 and 54 is constituted by a pair of spaced parallel rails. A brake shoe, as viewed in Figure 3, is slidably transported on each set, the rails extending along the entire length of the conveyor 30. Preferably, the upper surfaces of these rails are hardened and ground to prevent scoring and gouging.

Figure 4:
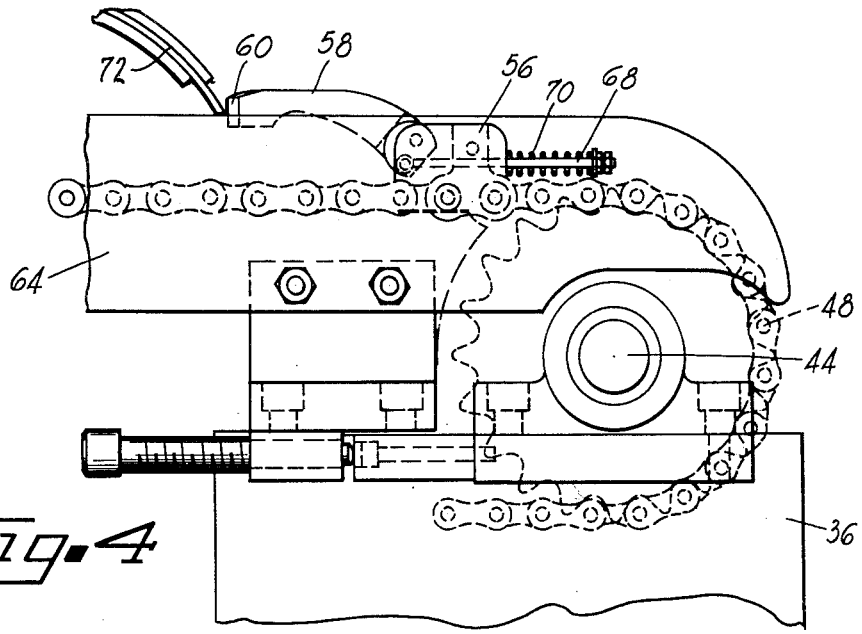
Figure 4 is a side elevation of the adjustable end section of the conveyor.

The pusher assemblies 50, as viewed more clearly in Figures 3 and 4, are fastened to chain 48 by means of standard chain attachments 56, and each pusher assembly constitutes a pusher member 58 formed with a hardened transverse flange 60 which moves on the upper surfaces of the inner slide rails 62 and 64 of the two sets of conveyor rails 52 and 54, respectively. The pusher member 58 is pivotally connected to attachment 56 and is further provided with a pivotal connection for a link 68 preloaded with a spring 70 acting in such a manner as to force the end flange 60 toward the chain 48. As viewed in Figures 3 and 4, the end flange 60 is yieldably urged against the upper surfaces of the slide rails 62 and 64 to engage and transport brake shoes 72 and 74 along the conveyor 30.

The articles or brake shoes worked upon by this brake grinding machine are characterized in the brake art as T-section brake shoes, the top bar of the T being the arcuate rim 79 having two longitudinal notches 81 in one end thereof (see Figure 22) and the stem of the T being the strengthening web 83. It will be seen that the end 85 of the rim 79 is not notched and is square across while the adjacent web end is recessed, as at 87, for accommodating certain structural elements in a brake assembly. The opposite web end in this illustration is also recessed at 87a for the same purpose. While the illustrated embodiment of the present invention has been designed to perform work upon this particular design of brake shoe, it will be obvious to one skilled in the art that for different brake shoe designs, certain concomitant changes must necessarily be made in the machine and these changes will be within the skill of such skilled person. It should be appreciated at this point that the functions of certain parts of this machine are directly dependent upon the shape and design of the articles worked upon, whereby it becomes necessary to design such parts of the machine to accommodate the particular design of the articles.

The machine of the present invention is so arranged that the pusher 58 must engage the end of the shoe adjacent notches 81 as illustrated in Figure 4. The relation between the shoe and the pusher is controlled by the person feeding the shoes to the conveyor, and if he should happen to misplace a shoe so that the pusher would engage the front or square end portion, as illustrated diagrammatically by the middle figure of Figure 19, to drag the shoe rather than push it, the machine will not function properly, as described in detail hereafter. Therefore, riser or skip members 76 are secured to the outer slide rails 78 and 80 of conveyor sets 52 and 54, respectively, to be inclined in the direction of transport. The one end 85 of the brake shoe rim, as the brake is conducted along the slide rails, will ride upon the riser members whereas the other end portion, provided with longitudinal notches 81 (see Figure 3) will miss them and not change its vertical relationship with the slide rails as seen more clearly in Figure 3. Obviously then the flange 60 must engage the end of the brake shoe having these cut-away portions 81, since if it should happen to engage the other end of the brake shoe, this engagement would be lost the moment this wide end 85 of the rim rides over the riser member. Therefore should the operator improperly place a brake shoe on the slide rails, as explained above, this riser member would effect rectification of the error and prevent accidental damage to the machine caused by feeding a shoe into the grinding mechanism in an improper manner.

A similar riser member 77 is used in conjunction with a switch 82, see right-hand figure of Figure 19, for each set of conveyor rails 52 and 54, the switch being disposed forward and above the riser 77, said switch to be engaged by the brake shoe only when it is placed on the slide rails in reversed attitude i. e., with pusher flange 60 engaging rim end 85 (Figure 22). The exact position of the switch 82 is determined by trial and is situated at a point where it will not be engaged by a properly positioned shoe, but will be by a reversed shoe. The switch 82 if engaged, will cause the machine to stop, thereby preventing accidental damage to the mechanism designed to accommodate a properly positioned shoe only.

The conveyor 30 is further provided with means for simultaneously conducting shoes of different widths. As viewed in Figure 1, the channel 84 is narrower than the channel 86, the narrower shoes being transported in channel 84 and the wider shoes in channel 86. A safety mechanism 88 is provided to stop the machine if a narrow shoe should be placed in a wide channel 86. This mechanism 88 (see Figure 20) comprises a horizontally supported leaf spring 89 disposed in cooperative relation with a micro-switch 91. A shoe of proper width will deflect spring 89 to actuate switch 91. A narrow shoe, as illustrated in Figure 20, will not cause actuation of this switch. Used in conjunction with the switch 91 is an overhead, rigidly supported micro-switch 93 adapted to be briefly actuated by engagement with the very top of the rim of every brake shoe which passes. Thus a shoe of proper size will actuate both switches substantially simultaneously, while an undersize shoe will actuate only one switch The electrical circuit between the switches is arranged to stop the machine whenever a narrow shoe fails to actuate switch 91.

On the delivering end of conveyor 30 is adjustably mounted (see Figure 5) a pair of depending inclined slides 90 for the channels 84 and 86 respectively. As the shoes are carried over this end of the conveyor, the rear end of the shoes will slide along the respective slide 90 for a purpose to be explained hereinafter.

Moving now to the second main assembly of the present invention, the loading device 32, it is seen that this device 32 is rigidly mounted by any suitable means in line with the delivering end of conveyor 30. Figures 5 and 7 illustrate the details of this device 32 which comprises a pair of chambers 92 and 94 in alignment with the channels 82 and 84 respectively. These chambers are constituted by a partition member 96 and a pair of spaced guide members 98 and 100, the sides of chamber 92 being constituted by guide member 98 and partition 96, and the sides of chamber 94 by guide member 100 and partition 96. These sides are spaced to the approximate width of the rim of a brake shoe for a purpose which will later become apparent.

Disposed on the outer sides of guide members 98 and 100 are a pair of gates or support members 102 and 104, respectively, pivotally supported along their upper edges by means of suitably supported anti-friction bearings 106 positioned above the guide members 98 and 100 respectively. These gates thus hang alongside the respective guide members and may be pivoted or swung outwardly.

Referring to Figure 7, the bottom edges or portions of the gates 102 and 104 are provided with inwardly projecting ledges 108 which extend slightly beyond the inner walls of the respective guide members 98 and 100. In the forward end of each ledge is a notch 110, its exact position depending upon the size brake shoe to be ground. This exact position will become apparent as the description proceeds. As viewed in Figure 5, one corner of the wide end of a brake shoe rim rests in the notch, thereby positioning the brake shoe within the respective chamber.

A brake shoe, for example, as it leaves the conveyor 30 is laterally guided between the guide member 98 and the partition 96, with its wide rim end sliding along the ledge 108 until it reaches the notch 110. Prior to this particular moment, the pusher 58 leaves the brake shoe and flips downwardly against the chain 48 under the influence of spring 79. The brake shoe comes to rest in the illustrated position, with one end in the notch 110 and the other end resting on the upper portion of end slide 90.

In order to insure that the brake shoe will be positively seated in this position, a pressure device in the form of a follower arm 112 is provided. This follower arm 112 carries a freely rotatable shoe engaging roller 114 on one end, and is pivoted in a suitable rigid structure at 116 to swing in a general plane defined by the shoe. The roller 114 is yieldingly urged downwardly against the brake shoe by a spring 118 connected to the end 120 of arm 112.

A gate stop or latch 122 is provided for each gate to limit its outward swinging movement while the machine is operating. The illustrated gate stop 122 embodies a support 124 rigidly fastened to a stationary member, such as an extension on leg member 38. This support 124 has an outwardly bent portion 126 upon the end of which is pivoted, at its apex, a V-shaped piece 128. As viewed in Figure 5, the ledges 108 protrude longitudinally beyond the lateral edges of the respective gates 102 and 104, these extensions being designated by reference numeral 130. Thus as a gate is swung outwardly, the extension 130 will strike V-shaped piece 128 and be prevented from further swinging movement. If it is desired to fully open the gate, the V-shaped piece 128 is pivoted out of the path of the extension 130. In Figure 7, only one gate stop 122 is shown for purposes of clarity of illustration.

A pair of fluid pressure power cylinders, such as the air cylinders 132, are carried by the respective gates with the cylinder plungers 134 projecting through companion perforations in the gates to engage the respective guide members, 98 and 100. Actuation of a cylinder 132 will force its plunger 134 against the respective guide member causing the gate to swing outwardly against its gate stop. When this happens, one end of the brake shoe, which heretofore had been resting on the respective ledge 108, will drop on stop plate 180 on the drum 34 under the pressure of follower arm 112. Continuing rotation of the drum will draw the brake shoe onto the clamping drum 34. This discharge motion of the brake shoe is guided by the engagement of its right end with the respective end slide 90. The importance of this particular discharge motion will become apparent as the description proceeds.

In order to insure that the gates 102 and 104 will not bounce upon closure, boxes 133 partially filled with lead shot 135 are secured to the respective gates to absorb any tendency to bounce. This positive closure action prevents accidental discharge of the brake shoes from the discharge device 32.

In Figures 1, 2, and 5, the grinding wheel 136 is shown journaled on a horizontal axis to lie in a plane perpendicular to the horizontal length dimensions of the chambers 92 and 94 and parallel to the axis of rotation of drum 34. The axes of the grinding wheel 136 and drum 34 are approximately located in the same horizontal plane, with the outer peripheral margin of the grinding wheel being disposed adjacent the clamping stations of the drum 34.

This clamping drum 34 (see Figures 9 to 12) is comprised of a cylindrical member 138 reduced in its axial central portion to provide a pair of annular recesses 140. The diameter of the portion intermediate the recesses is formed slightly larger than the diameter of the bottoms of the recesses, and an annular key 142 is concentrically carried by this larger portion intermediate its edges. The ends of the cylindrical member 138 are hollowed out to form cavities 144 and 146 which are made dustproof by suitable gaskets. A closure plate 147 may be provided for each cavity to facilitate access to the interiors thereof for maintenance purposes.

Snugly fitted to the annular key 142 are a pair of identical circumferentially arranged, semicircular locating members, or segments 148 and 150. These members 148 and 150 serve as the supporting elements for the two part brake shoe locating elements serving to position the brake shoe axially of the drum, each locating element being generally indicated by a reference numeral 152 (see Figures 13 and 14). Three locating elements 152 are provided on each locating member 148, 150 and are circumferentially spaced to be engaged by the lateral end and center portions of a brake shoe rim, as illustrated in Figure 12.

Each locating element 152 comprises a pair of small blocks 154 having rectangular bosses 156, the blocks 154 being received in axially spaced companion sockets 158 in the locating members, 148, 150. These blocks 154 are held in position by means of set screws 160 threadedly received in the respective locating members, 148, 150, and are made adjustable in a line parallel to the drum axis by means of the elongated holes 162 formed to accommodate the heads of the set screws 160. To adjust the block 154, an adjusting screw 164 is threadedly projected therethrough to engage one side of a hardened abutment 166 suitably fastened in the respective locating member, 148, 150. The edge 168 of the rectangular boss 156 is the part of the structure which is engaged by the brake shoe rim.

Each recess 140 receives in circumferential order a pair of semi-circular clamping members or jaws 170, each jaw 170 being supported by a universal fitting 172, in juxtaposition with a respective locating segment, 148, 150. Each jaw is axially movable and capable of limited wobbling movement about its universal fitting. A plurality of spacer studs 174 are secured to the inner peripheries of each jaw for locating it with respect to the bottom of the respective recess 140. A peripheral flange 176 is provided on each jaw 170, and it constitutes the portion on the jaw which engages the brake shoe rim. Thus, a brake shoe may be clamped between each group of three locating elements 152 (Figures 10 and 12) and a respective jaw flange 176. The locating elements 152 being adjustable, variations in the width of rims due to manufacturing tolerances in successive production runs of rims may be accommodated to insure firm clamping at all times.

In order to locate the brake shoes circumferentially of the drum, locating pins 178 are suitably carried in both ends of each of the locating segments, 148 and 150, and laterally project therefrom only far enough to be engaged by the ends 87 and 87a of the brake shoe webs (Figure 22). This is best illustrated in Figure 12.

A plate member 180 is secured between the adjacent ends of the locating segments 148 and 150 to project slightly beyond their outer peripheries. Each of these plates serves as an initial catch or stop for the end of the brake shoe dropped from the notch 110 of the loading device 32. As the drum 34 is caused to rotate in a counterclockwise direction, the gates 102, 104 will open at a predetermined instant to discharge the enclosed brake shoes onto the drum 34 where they are momentarily positioned between the plate 180 and the end slides 90. As the drum continues to rotate, the raised ends of the brake shoes slide down the end slides 90, whereby said shoes become positioned between respective pairs of locating pins 178 and against the respective locating points 152. The follower arms 112 urge the brake shoes onto the drum, and the combination of the follower arms and the end slides 90 eliminates the tendency of the brake shoes to bounce upon contacting the drum. This is important inasmuch as the respective jaw 170 firmly clamps the shoe against the respective locating elements 152 shortly after the shoe seats on the drum. Obviously, if a shoe should bounce, the jaw 170 might clamp the shoe in an unseated position.

The chambers 92 and 94 of the discharge device must be vertically aligned with respect to the corresponding jaws 170, since proper prelocating of the shoes on the drum is a function of such alignment.

Extending from each recess 140 into the adjacent cavity are a pair of diametrically disposed openings 182 and 184, each opening being in registry with the central portion of a respective jaw 170 and having its axis substantially parallel to the axis of the drum 34. Plungers 186 and 188 are reciprocably received in these openings 182 and 184 respectively, and each is formed on one end with a spherical portion 185. This portion 185 loosely fits into a socket 187 formed in the respective jaw 170 thereby constituting the aforementioned universal or wobble connection 172. To prevent the entrance of dust and other foreign matter into cavities 144 and 146, a rubber boot 189 is fitted around the exposed portion of each plunger 186 and 188.

A toggle joint 190 (hereinafter referred to as toggle 190) is connected to the other end of each plunger 186, and a toggle joint 192 (hereinafter as toggle 192) of slightly different design is connected to the other end of each plunger 184, there being one each of these toggles in each cavity 144 and 146 respectively. One link of each toggle 190 is a bell crank 191 with the pivot thereof being connected to the cylindrical member 138 by means of an eccentric adjusting pin 194. A link 196 in each cavity 144 and 146 connects the hinge of each toggle 190 with the hinge of a respective toggle 192. Thus it is seen that as a link 196 is moved longitudinally, one toggle will be straightened while the other toggle will be collapsed causing opposite movements of the respective plungers 186 and 188.

Extending in parallel relation with the axis of the cylindrical member 138 is a bore 198 which accommodates for reciprocation operating rod 200. One end of this rod is connected to bell crank 191 in cavity 144 and the other end is connected to an equalizer member 202. Said equalizer 202 corrects the positions of the toggles if only one brake shoe is loaded on the drum 34.

Hubs 204 and 206 on the cylindrical member 138 support the drum for rotation, hub 206 having a bore 208 reciprocably receiving a piston rod 210. An equalizing link 209 pivotally connects the piston rod 210 to the equalizer 202. On the outer end of hub 206 is carried a double acting pneumatic actuator 212 which consists of a rotating cylinder 213 and a piston 214 operatively connected to piston rod 210. For an increase in pressure on the left side of piston 214, equalizer 202 and rod 200 will be moved to the right, and for an increase on the right side, the equalizer 202 and rod 200 will be moved to the left. The air cylinder 213 is arranged to rotate with the drum 34. Anti-friction bearings 216 support the stationary air shaft 218 which contains a pair of passages 219 and 221, passage 219 communicating with the right side of piston 214 and passage 221 with the left side.

With reference to the above description of the drum 34, a brief explanation of its operation will now be given. Referring to Figure 10, by raising the pressure on the left side of piston 214, piston rod 210 will be moved to the right carrying with it the equalizing link 209 and equalizer 202. This motion is imparted to the bell cranks 191 of toggles 190 causing the one in cavity 146 to collapse and the one in cavity 144 to straighten, and the associated respective toggles 192 to be oppositely operated through the links 196. The plungers 186 are thereby moved to the right carrying with them the respective jaws 170, the upper left jaw 170 being moved to clamping position and the lower right jaw to unclamping position. Plungers 188 are simultaneously moved to open the lower left jaw 170 and to close the upper right one. By dropping the fluid pressure on the left side of piston 214 and raising that on the right side, the jaws 170 will be moved in opposite directions. The force at which a jaw 170 clamps a brake shoe in place is a direct function of the pressure acting on piston 214 and the angles of the respective toggles 190 and 192.

In order to prevent damage to the grinding wheel, a safety mechanism, generally indicated at 270, Figures 5, 6, and 3, is positioned adjacent drum 34, just described. This mechanism comprises a gib 272 pivoted on a stationary support by means of anti-friction bearings 273. A traversing part 274 cooperatively fitted on gib 272 is adapted to reciprocate vertically and carries as a depending trip bar a sheet metal strip 276. A pair of rods 278 provide vertical support for the traversing part 274, and protrude through the gib plate 272 to receive thereon a pair of supporting springs 280 and adjusting nuts 282. A micro-switch 284 is mounted on the top edge of gib plate 272 between the rods 278, with its plunger extending downwardly in registry with a vertical actuating rod 286. This rod 286 is dropped into a socket 288 in gib plate 272, and is supported by means of the integral collar 290. A compression spring 292 bears against this collar 290 to urge said rod 286 to the illustrated seated position. A protruding tooth member 294 is suitably secured to partition 96 of loading device 32, and is engaged by a detent 296 provided on traversing part 274. With said detent 296 engaging said tooth member 294, traversing part 274 will be held in its down or cocked position. By exerting a slight pressure in the left hand direction (see Figure 5) on trip bar 276, the detent 296 will be disengaged and traversing part 274 shot upwardly from the grinding zone under the influence of springs 280 to engage actuating rod 286. This rod 286 in turn is moved upwardly until it engages the plunger of switch 284 to turn the machine off.

This safety mechanism 270 is positioned with respect to the drum 34 and its grinding circle in such a manner that if a brake shoe should not be contiguously seated on the rotating drum, it will project radially outwardly over the grinding circle enough to engage the trip bar 276 and to trigger the safety mechanism 270.

In the illustrated embodiment, the safety switch 284 is connected into a dynamic braking circuit to prevent the momentum of the revolving drum 34 from carrying the improperly clamped brake shoe into the grinding wheel.

Another safety mechanism 298, illustrated in Figure 17, is provided to stop the grinding machine in case a shoe should fail to drop out of drum 34 at the discharge point. This mechanism comprises a pair of trip fingers 300, one finger serving each clamping station and adjusted to operate outside the grinding circle of drum 34. These trip fingers 300 are supported on a pivot shaft 302 suitably journaled in leg member 38 of the conveyor frame. On one end of the shaft 302 is secured a lever 304, the combination of these fingers 300 and lever 304 constituting a bell crank. The other end of the lever 304 is pivotally connected to an operating link 306 which is guided in a flange member 308 to engage one end of another lever 310 pivoted in leg member 38. A micro-switch 312 is secured on leg member 38 in operative relation with lever 310 whereby movement of lever 310 will actuate switch 312. If a brake shoe should fail to fall from the drum 34 when the jaws 170 open, the shoe will be carried around by the drum and engage the respective trip finger 300 moving it in a counterclockwise direction as viewed in Figure 17. This motion of finger 300 is imparted through lever 304, link 306 and lever 310 to the switch 312 which is actuated to shut down the machine.

The hub 204 of drum 34 is journaled in a transmission casing generally indicated by reference numeral 314 which is constituted by a worm and wheel gear assembly for revolving said drum 34 and a train of spur gears for revolving sprocket 46 of conveyor 30. This transmission is designed to synchronize the travel of chain 48 of conveyor 30 with the revolving of drum 34.

On a shaft 316 projecting from the transmission 314 is secured a set of revolvable timing cams 318, 320 and 322 as shown in Figures 15 and 16. These three timing cams are arranged to engage respectively the fluid or pneumatic valves 324, 326 and 328 shown connected in a fluid system by the diagrammatic illustration of Figure 18. Valve 326 is operably connected to the power cylinders 132 which operate to open and close the gates 102 and 104 of loading device 32. The valves 324 and 328 are operable to control piston 214 in the rotating air cylinder 212. These timing cams are so arranged that the gates 102 and 104 will close as a shoe is delivered to the ledges 108 by the conveyor 30. Then as the drum 34 rotates in its counterclockwise direction until an open clamping jaw 170 is directly beneath the ledges 108, the valve 326 is operated to open gates 102 and 104 allowing the brake shoes in loading device 32 to slide into the respective clamping stations on the drum 34. Continued counterclockwise motion of drum 34 will actuate, for example, valve 324 to energize power cylinder 212 to clamp these shoes into position. The drum 34 continuing its rotation carries the shoes into the grinding wheel whereby the outer peripheral surface of the shoe is ground to radial size. As the drum 34 reaches a discharge point where the shoes are in a position diametrically opposite the loading device 32, valve 328 is operated to cause power cylinder 212 to move the jaws 170 in an opposite direction thereby releasing the ground shoes which fall under the force of gravity from the drum. Thus it is seen that as shoes are being clamped into the drum, the ground shoes are being discharged therefrom.

The machine is shown as being driven by two electric motors 330 and 332, motor 330 being used to drive the grinding wheel 136 and motor 332 being connected to the input side of transmission 314.

The safety control circuit for these motors, schematically illustrated in Figure 21, incorporates all of the previously described safety switches and comprises a power input transformer 334 connected in series with a normally open magnetic contactor 336, the contact 338 of which is connected in series with the energizing circuits of motors 330 and 332. Further connected in series with said transformer 334 and contactor 336 are normally closed safety switches 284, 312, 32, and 93. Normally open switch 91 is connected in parallel with switch 93. Neon pilot lamps A, B, C, D, and E are respectively connected in parallel with switches 284, 312, 32, and 93 whereby opening of any one of these switches will cause the paralleled pilot lamp to light and indicate which switch is opened. The operator is thus, in effect, told where to look for trouble in the machine, since the circuit is so arranged that the contact 338 is closed only when the safety switches are closed, and when one of the latter switches is opened, magnetic contactor 336 causes contact 338 to open and break the energizing circuit to motors 330 and 332.

While the foregoing description has incorporated in detail the mode of operation of the various mechanisms of the present invention, a brief review of such operation follows as generally applicable to the invention as an entity. Brake shoes may be fed into only one of the channels 84 or 86, or may be fed into both simultaneously. With this arrangement shoes of different sizes may be ground in the same machine, for example, as disclosed in Figure 1, a shoe having a relatively wide rim may be fed into channel 86 while a shoe having a narrow rim may be fed into channel 84. To facilitate the explanation of operation, a shoe will be followed through the machine after it has been placed in channel 84, since the mode of operation is substantially the same for both channels.

The shoe is placed on the conveyor with the widest end of the rim forward and with the pusher 50 engaging the rear end thereof. The brake shoe is carried down channel 84 and is delivered into position onto the ledge 108 of loading device 32 and rail extension 90. When the drum has rotated to the proper position to actuate cam 326, the gate 102 is opened and the wide end of the brake shoe drops onto the locating plate 180 of the drum 34, and as the drum rotates the shoe slides into the clamping stations of drum 34. The drum clamps the shoe into position, carries it into the grinding wheel, and then discharges it at the nadir of rotation. The machine is so synchronized that a shoe will be delivered to the drum 34 while a ground shoe is being discharged therefrom.

Although only one embodiment of the invention has been illustrated and described, various changes in the form and relative arrangements of the parts may be made to suit requirements.

We claim:

1. In a brake shoe grinding machine, a rotatable shoe clamping drum comprising a cylindrical member having a cavity formed in each end and a pair of axially spaced annular recesses formed in its outer peripheral central portion, a pair of semicircular brake shoe locating segments circumferentially arranged on said cylindrical member in a plane perpendicular to the axis thereof and intermediate said recesses, three adjustable circumferentially spaced brake shoe locating points carried on the outer periphery of each locating segment, said locating points being spaced to engage the ends and center portion of the lateral edge of a brake shoe rim and axially adjustable to compensate for rim manufacturing tolerances, a brake shoe stop plate mounted between each pair of adjacent ends of said locating segments to project slightly beyond the peripheries thereof, a brake shoe locating pin carried in each end of each locating segment adapted to engage a corresponding end of a brake shoe web positioned upon a locating segment, a pair of axially movable semicircular jaw members circumferentially arranged in each recess, each jaw member being in circumferential and axial alignment with a corresponding locating segment, a brake-shoe-rim-edge-engaging ledge carried on the outer periphery of each jaw member and adapted to clamp a brake shoe rim between said three locating points and said ledge, an axially extending force transmitting plunger for each of said jaw members reciprocably carried in said cylindrical member with one end of each plunger being connected to the central portion of the corresponding jaw member and the other end thereof projecting away from said jaw member into the adjacent cavity, each jaw member being capable of limited wobbling movement with respect to its plunger, a force generating toggle for each of said plungers connected between the cavity end of the plunger and the wall of the corresponding cavity whereby forceful movement may be imparted to said plunger, an axially extending main force transmitting rod reciprocably carried inside said cylindrical member, each end of said rod terminating in a respective cavity, said rod being operatively connected to one toggle in each cavity, a link member in each cavity connected between the toggles therein adapted to cause actuation of one toggle by release of the other, and a double acting fluid pressure power cylinder operatively connected to one end of said rod, said power cylinder being operable in one direction to close one axially aligned set of jaw members upon the respective locating segment and to open the diametrically opposite set, and operable in the opposite direction to open the closed set and close the open set.

2. In a brake shoe grinding machine, a rotatable shoe clamping drum comprising a cylindrical member having a cavity formed in each end and a pair of axially spaced annular recesses formed in its outer peripheral central portion, a pair of semicircular brake shoe locating segments circumferentially arranged on said cylindrical member in a plane perpendicular to the axis thereof and intermediate said recesses, three adjustable circumferentially spaced brake shoe locating points carried on the outer periphery of each locating segment, said locating points being spaced to engage the ends and center portion of the lateral edge of a brake shoe rim and axially adjustable to compensate for rim manufacturing tolerances, a brake shoe locating member carried in each end of each locating segment adapted to engage a corresponding end of a brake shoe web positioned upon a locating segment, a pair of axially movable semicircular jaw members circumferentially arranged in each recess, each jaw member being in circumferential and axial alignment with a corresponding locating segment, an axially extending force transmitting plunger for each of said jaw members reciprocably carried in said cylindrical member with one end of each plunger being connected to the central portion of the corresponding jaw member and the other end thereof projecting away from said jaw member into the adjacent cavity, each jaw member being capable of limited wobbling movement with respect to its plunger, a force generating toggle for each of said plungers, an axially extending main force transmitting rod reciprocably carried inside said cylindrical member, each end of said rod terminating in a respective cavity, said rod being operatively connected to one toggle in each cavity whereby actuation of this one toggle will effect release of the other toggle, and a double acting fluid pressure power cylinder operatively connected to one end of said rod, said power cylinder being operable in one direction to close one axially aligned set of jaw members upon the respective locating segment and to open the diametrically opposite set, and operable in the opposite direction to open the closed set and close the open set.

3. In a brake shoe grinding machine, a rotatable shoe clamping drum comprising a cylindrical member having a cavity formed in each end and a pair of axially spaced annular recesses formed in its outer peripheral central portion, a pair of semicircular brake shoe locating segments circumferentially arranged on said cylindrical member in a plane perpendicular to the axis thereof and intermediate said recesses, three adjustable circumferentially spaced brake shoe locating points carried on the outer periphery of each locating segment, said locating points being spaced to engage the ends and center portion of a lateral edge of a brake shoe rim and axially adjustable to compensate for rim manufacturing tolerances, a brake shoe locating member carried in each end of each locating segment adapted to engage a corresponding end of a brake shoe web positioned upon a locating segment, a pair of axially movable semicircular jaw members circumferentially arranged in each recess, each jaw member being in circumferential and axial alignment with a corresponding locating segment, a universal connection provided in the central portion of each jaw member, each jaw member thereby being capable of limited wobbling movement, a force generating toggle operatively connected to each of said universal connections and disposed in the cavity closest the corresponding universal connection, an axially aligned main force transmitting rod reciprocably carried inside said cylindrical member, each end of said rod terminating in a respective cavity, said rod being operatively connected to one toggle in each cavity whereby actuation of this one toggle will effect release of the other toggle, and double acting power means operatively connected to said rod, said power means being operable in one direction to close one axially aligned set of jaw members upon the respective locating segment and to open the diametrically opposite set, and operable in the opposite direction to open the closed set and close the open set.

4. In a brake shoe grinding machine, a rotatable shoe clamping drum comprising a cylindrical member having a pair of axially spaced annular recesses formed in its central outer peripheral portion, a pair of semicircular brake shoe locating segments circumferentially arranged on said cylindrical member in a plane perpendicular to the axis thereof and intermediate said recesses, three adjustable circumferentially spaced brake shoe locating points carried on the outer periphery of each locating segment, said locating points being spaced to engage the ends and center portion of the edge of a brake shoe rim and axially adjustable to compensate for rim manufacturing tolerances, a brake shoe locating member carried in each end of each locating segment adapted to engage a corresponding end of a brake shoe web positioned upon the locating segment, a pair of axially movable semicircular brake shoe clamping jaws arranged in circumferential order in each recess, each being in circumferential and axial alignment with a corresponding locating segment, a universal connection provided in the central portion of each clamping jaw, each clamping jaw thereby being capable of limited universal movement, a force generating device operatively connected to each of said universal connections, and power transmitting mechanism operatively connected to each force generating device selectively operable to close one axially aligned set of clamping jaws upon the respective locating segment and to open the diametrically opposite set of clamping jaws, and then to open the closed set and close the open set.

5. In a brake shoe grinding machine, a rotatable shoe clamping drum comprising a cylindrical member having a pair of axially spaced annular recesses formed in its central outer peripheral portion, a pair of axially movable semicircular brake shoe clamping jaws in each recess, the clamping jaws in the different recesses being in axial alignment, a plurality of adjustable circumferentially spaced brake shoe locating points carried by said drum between said recesses, said locating points being spaced with respect to said clamping jaws whereby a brake shoe introduced between a clamping jaw and said locating points may be clamped in a predetermined plane, means positioned on said drum for locating a brake shoe circumferentially of a jaw, a universal connection provided in the central portion of each clamping jaw, each clamping jaw thereby being capable of limited wobbling movement, a force generating device operatively connected to each of said universal connections, and power transmitting mechanism operatively connected to each force generating device selectively operable to close one axially aligned set of clamping jaws upon the respective locating points and to open the diametrically opposite set of clamping jaws, and then to open the closed set and close the open set.

6. In a brake shoe grinding machine, a rotatable shoe clamping drum comprising a cylindrical member having a pair of axially spaced annular recesses formed in its central portion, a plurality of brake shoe clamping jaws in each recess, a plurality of adjustable circumferentially spaced brake shoe locating points carried by said drum between said recesses, said locating points being spaced and arranged in groups whereby a brake shoe held against any one group of locating points will be positioned in a predetermined plane, each of said jaws being cooperatively associated with a respective group of said locating points to clamp a brake shoe therebetween in a predetermined circumferential position, a supporting device arranged to position each clamping jaw in its respective recess, each clamping jaw being capable of limited wobbling movement with respect to its supporting device, a force generating device operatively connected to each of said supporting devices, and power transmitting mechanism operatively connected to each force generating device and selectively operable to open and close said clamping jaws upon said locating points.

7. In a brake shoe grinding machine, a rotatable shoe clamping drum comprising a cylindrical member having a pair of axially spaced annular recesses formed in its central portion, a plurality of brake shoe clamping jaws in each recess, a plurality of adjustable circumferentially spaced brake shoe locating points carried by said drum between said recesses, said locating points being spaced and arranged in groups whereby a brake shoe held against any one group will be positioned in a predetermined plane, each of said jaws being cooperatively associated with one group of locating points to clamp brake shoes therebetween in predetermined circumferential positions, a universal connection positioning each clamping jaw in its recess, each clamping jaw being capable of limited wobbling movement by means of said universal connection, and a force generating device operatively connected to each of said universal connections.

8. In a brake shoe grinding machine, a rotatable brake shoe clamping drum provided with two clamping stations comprising a cylindrical member rotatable about its axis, a brake shoe locating member carried by said drum and being disposed between the two stations, an axially movable brake shoe clamping member on each side of said locating member, a universal connection for each clamping member for supporting the same, each connection being operable to selectively clamp a brake shoe against said locating member, and controllable means operatively connected to each universal connection and by virtue of its movement in one direction arranged to force each clamping member toward said locating member through the intermediary of said universal connection and further arranged, by virtue of its movement in the other direction, to move the clamping members away from the locating members.

9. In a brake shoe grinding machine, a rotatable brake shoe clamping drum provided with two clamping stations comprising a cylindrical member rotatable about its axis, an arcuate brake shoe locating member associated with said drum and being disposed intermediate the two stations, three circumferentially spaced brake shoe locating elements carried on said locating member and adapted to be engaged by the ends and center portion of an arcuate brake shoe rim, an axially movable brake shoe clamping member arranged on each side of said locating member, a universal connection for each clamping member for supporting the same, each connection being operatively connected to each clamping member and operable to selectively clamp a brake shoe against said locating member, and controllable means arranged to forceably urge each clamping member toward said locating member through the intermediary of its universal connection.

10. In a brake shoe grinding machine, a rotatable brake shoe clamping fixture comprising two clamping stations, each station having two oppositely acting clamping sections, each section comprising one movable jaw member and a stationary member capable of clamping a brake shoe in a predetermined position, said stationary member being common to all clamping sections, a universal connection supporting each movable jaw member whereby the jaw member is capable of limited wobbling movement, and fluid pressure power means operatively connected to each universal connection for forcing said jaw member toward said stationary member to clamp a brake shoe therebetween.

11. In a brake shoe grinding machine, a rotatable brake shoe clamping fixture provided with two clamping stations, each station having two oppositely acting clamping sections, each section comprising one movable jaw member and a stationary member capable of clamping a brake shoe in a predetermined position, said stationary member being common to all clamping sections, two sets of adjustable locating members carried by said stationary member, each set of locating members serving two clamping sections and spaced to define a plane of brake shoe engaging points, a universal connection supporting each movable jaw member whereby the jaw member is capable of limited wobbling movement, and fluid pressure power means operatively connected to each universal connection for forcing said jaw member toward said stationary member to clamp a brake shoe between said jaw member and the shoe engaging points on said locating members.

12. In a brake shoe clamping drum, a dual toggle joint arrangement in which one toggle joint comprises a bell crank pivotally connected to a link member and the other toggle joint comprises a pair of pivotally connected link members, and an element pivotally connected to said bell crank and reciprocable to rock said crank, and a member pivotally connected at one end to the first mentioned pivotal connection and at its other end to the second mentioned pivotal connection whereby actuation of one toggle joint causes the release of the other toggle joint.

13. In a brake shoe clamping drum, a dual toggle joint arrangement in which one toggle joint comprises a bell crank pivotally connected to a link member and the other toggle joint comprises a pair of pivotally connected link members, means associated with one link of each toggle joint for adjusting the toggle joint ends closer together or farther apart, and a member pivotally connected at one end to the first mentioned pivotal connection and its other end to the second mentioned pivotal connection whereby actuation of one toggle joint causes the release of the other toggle joint.

14. In a brake shoe grinding machine, a loading device providing a pair of brake shoe receiving chambers, each having an opening, and comprising a vertical center partition between said chambers, a lateral guide member carried on each side of said partition in spaced parallel relation to form the outer sides of said chambers, a pair of support members, each pivoted along its upper edge by means of anti-friction bearings to hang adjacent a corresponding lateral guide member, an inwardly projecting ledge extending along the bottom edge of each support member to project inwardly a slight distance beyond the lowest edge of the respective lateral guide member, a positioning notch formed in the upper surface of each ledge remote from the corresponding chamber opening, said notch serving to positively locate a brake shoe in the respective chamber, a fluid operable actuator carried on each support member to selectively engage the respective guide member for swinging away the respective support member to permit one end of the brake shoe resting on the ledge to fall from the respective chamber, a gravity positioned latch member operatively associated with each support member to limit its outward swinging movement, and a follow-up member pivotally carried in each chamber having a brake shoe roller engaging member, said follow-up member serving to yieldably urge a brake shoe in the respective chamber downwardly against said ledge.

15. In a brake shoe feeding machine, a loading device defining a chamber having an opening for receiving brake shoes in successive order comprising lateral guide members which serve as the sides for the chamber, said lateral guide members serving to restrict the lateral movement of the brake shoe, a pendent support member pivotable along its top edge disposed and abutting against one of said guide members, a vibration absorbing means carried by said support member and adapted to resist the tendency of said support member to bounce as it is abutted against said one guide member, an inwardly projecting ledge extending along the bottom edge of said support member constituting the bottom for the chamber, a positioning notch provided in said ledge in the end opposite said receiving opening, the brake shoes which are fed into said receiving opening coming to rest between said guide members, said positioning notch and said ledge, fluid pressure means carried by said support member for selectively opening and closing said support member with respect to said one guide member to permit the one end of a brake shoe resting on said ledge to drop from the chamber and to permit a successive brake shoe to be positioned in the chamber, and a follower arm pivotally supported at one end near the upper vicinity of said receiving opening, the other end of said arm extending toward said ledge and arranged to yieldably engage and urge a brake shoe against said ledge.

16. In a brake shoe grinding machine, a loading device defining a horizontal chamber having an opening at one end for receiving brake shoes in successive order comprising horizontally extending lateral guide members which serve as the sides for the chamber, a positioning member mounted adjacent the ends of said guide members and spaced horizontally from said receiving opening and adapted to longitudinally position a brake shoe in the chamber, said lateral guide members serving to restrict the lateral movement of the brake shoe, a pendent support member pivotable along its top edge disposed alongside one of said guide members, an inwardly projecting ledge having a horizontal elongated flat surface and extending along the bottom edge of said support member thereby constituting the bottom for the chamber, the brake shoes which are fed into said receiving opening coming to rest between said guide members and said ledge, and means mounted on said support member and engageable with said one guide member for selectively pivoting said support member to permit the brake shoe resting on said ledge to drop from the chamber and to permit a successive brake shoe to be positioned in the chamber.

17. In a brake shoe grinding machine, a loading device defining a chamber having an opening for receiving brake shoes in successive order comprising horizontally disposed lateral guide members which serve as the sides for the chamber, a positioning member mounted adjacent the ends of said guide members remote from said receiving opening adapted to longitudinally position a brake shoe in the chamber, said lateral guide members serving to restrict the lateral movement of the article, a pendent support member pivotable along its top edge disposed alongside one of said guide members, a relatively long and narrow inwardly projecting ledge extending along the bottom edge of said support member and constituting the bottom for the chamber, said ledge having an elongated flat upper surface which extends into said chamber away from said receiving opening, the brake shoe fed into said receiving opening coming to rest between said guide members and said upper surface, and means carried by the loading device for yieldably urging a brake shoe against said ledge.

18. In a brake shoe grinding machine, a loading device providing a chamber having an opening for receiving brake shoes in successive order comprising a pair of spaced parallel guide members, one guide member for each side of said opening, said guide members serving as the sides of the chamber and having flat vertical and horizontally extending inner surfaces, a support member pivoted by its uper edge by means of anti-friction bearings to hang adjacent the outer side of one of said guide members, an inwardly projecting ledge extending along the bottom edge of said hinged support members to project a short distance laterally beyond the lowest edge of said one guide member and having a flat upper surface, a positioning notch formed in the upper surface of the end of said ledge remote from said opening, said notch serving to positively locate a brake shoe in the chamber, brake shoes which may be fed into said opening coming to rest between the inner surfaces of said guide members and said ledge, means operatively engaging said support member for selectively swinging said support member away from said one guide member to permit a brake shoe resting on said ledge to fall from the chamber, and a gravity positioned latch member operatively engaging said support member to limit its outward swinging movement.

19. In a brake shoe grinding machine, a loading device providing a pair of brake shoe receiving chambers, each having an opening, and comprising a vertical center partition between said chambers, a lateral guide member carried on each side of said partition in spaced parallel relation to form the outer sides of said chambers, a pair of support members, each pivoted along its upper edge to hang adjacent a corresponding lateral guide member, an inwardly projecting ledge extending along the bottom edge of each support member to project a slight distance beyond the lowest edge of the respective lateral guide member, a positioning notch formed in the upper surface of each ledge at a point remote from the corresponding chamber opening, said notch serving to positively locate a brake shoe in the respective chamber, a fluid operable actuator carried on each support member to selectively engage the respective guide member for swinging away the respective support member to permit a brake shoe resting on a ledge to slide from the loading chamber, and a gravity positioned latch member operatively engaging each support member to limit its outward swinging movement.

20. In a brake shoe feeding machine, a loading device providing a pair of article receiving chambers, each having an opening, and comprising a vertical center partition between said chambers, a lateral guide member carried on each side of said partition in spaced parallel relation to form the outer sides of said chambers, a pair of support members, each pivoted along its upper edge to hang adjacent and parallel to a corresponding lateral guide member, an inwardly projecting ledge extending along the bottom edge of each support member to project a slight distance beyond the lowest edge of the respective lateral guide member, a positioning notch formed in the upper surface of each ledge at a point remote from the corresponding chamber opening adapted to receive one corner of a brake shoe rim, said notch serving to positively locate a brake shoe in the respective chamber, and a fluid operable actuator carried on each support member to selectively engage the respective guide member for swinging away the respective support member to permit a brake shoe resting on a ledge to fall from the discharge chamber, and a gravity positioned latch member operatively associated with each support member to limit its outward swinging movement.

21. In a brake shoe grinding machine, in combination with a rotatable brake shoe clamping drum a loading device defining a chamber having an opening for receiving brake shoes in successive order comprising lateral guide members which serve as the sides for the chamber, a positioning member mounted between said guide members adapted to longitudinally position a brake shoe in the chamber, said lateral guide members serving to restrict the lateral movement of the brake shoe, a pendent support member pivotable along its top edge disposed alongside one of said guide members, a vibration absorbing means carried by said support member, an inwardly projecting ledge extending along the bottom edge of said support member constituting the bottom for the chamber, the brake shoes which are fed into said receiving opening coming to rest between said guide members, said positioning member, and said ledge, means engaged with said support member for selectively opening and closing said support member with respect to said one guide member to permit the brake shoe resting on said ledge to drop from the chamber and to permit a successive brake shoe to be positioned in the chamber, a follow-up member pivotally supported in said chamber and yieldably urged toward said ledge and adapted to yieldably urge a brake shoe against said ledge, said shoe clamping drum being provided with a clamping station capable of clamping a brake shoe in a predetermined position, said drum having its axis of rotation in a horizontal plane and being positioned with its clamping station in registry with the bottom of said chamber, and means synchronizing the rotation of said drum with the means for opening and closing said support member whereby the brake shoe sliding from said chamber will locate in said station in a predetermined place, said follow-up member being arranged to follow the brake shoe onto said drum thereby tending to prevent the brake shoe from bouncing.

22. In a brake shoe grinding machine, in combination with a rotatable brake shoe clamping drum a loading device defining a chamber having an opening for receiving brake shoes in successive order comprising lateral guide members which serve as the sides for the chamber, a positioning member mounted between said guide members adapted to longitudinally position a brake shoe in the chamber, said lateral guide members serving to restrict the lateral movement of the brake shoe, a pendent support member pivotable along its top edge disposed alongside one of said guide members, a vibration absorbing means carried by said support member, an inwardly projecting ledge extending along the bottom edge of said support member constituting the bottom for the chamber, brake shoes which may be fed into said receiving opening coming to rest between said guide members, said positioning member, and said ledge, a fluid pressure operable means carried by said support member to selectively engage said guide member for swinging away said support member to permit a brake shoe on said ledge to slide from the chamber, a follow-up member supported in said chamber and yieldably urged toward said ledge and adapted to yieldably urge a brake shoe against said ledge, said shoe clamping drum being provided with a clamping station capable of clamping a brake shoe in a predetermined position, said drum having its axis of rotation in a horizontal plane and being positioned with its clamping station in registry with the bottom of said chamber, and means synchronizing the rotation of said drum with the means for opening and closing said support member whereby the brake shoe dropping from said chamber will slide into said station in a predetermined place, said follow-up member being arranged to follow the brake shoe onto said drum, thereby tending to prevent the brake shoe from bouncing.

23. In a brake shoe grinding machine, a conveyor comprising two pairs of parallel spaced slide rails, a sprocket journaled between the adjacent ends of said pairs of slide rails, an endless chain engaging said sprockets, a plurality of equi-spaced pusher members carried by said chain and slidably engaging one rail of each pair of rails for transporting brake shoes along said slide rails, a riser member carried by one of said slide rails out of the path of said pusher members, said riser member being inclined in the direction of transport of said pusher members and adapted to lift a brake shoe out of engagement with the transporting pusher member when the brake shoe is improperly positioned on the slide rails.

24. In a brake shoe feeding machine, a conveyor comprising a pair of parallel spaced slide rails, a sprocket journaled adjacent each pair of slide rail ends, an endless chain engaging said sprockets, a plurality of pusher members carried by said chain and engaging at least one of said rails for transporting brake shoes along said slide rails, an inclined plane member carried by one of said slide rails out of the path of said pusher members, said inclined plane member being inclined in the direction of pusher member transport and adapted to lift one end of the brake shoe out of engagement with said slide rails and the transporting pusher member.

25. In a brake shoe grinding machine, a loading device comprising a pair of spaced parallel horizontally disposed guide members, means rigidly supporting said guide members in the aforementioned relation, a horizontally extending support member disposed between and below said guide members, said support member being fixedly secured to a hanger element pivoted on said means in such a manner as to allow said support member to be selectively moved from between said guide members, an abutment provided on said support member near one end thereof and serving as a stop against which one end of a brake shoe may rest thereby providing a means for positioning a brake shoe on said support member and between said guide members, a follower arm pivoted at one end on said means and disposed between said guide members, resilient means urging the end of said follower arm remote from the pivoted end downwardly toward said support member, and means operatively connected to said hanger for selectively moving said support member to and away from its position beneath and between said guide members.

26. In a brake shoe grinding machine, a loading device comprising a pair of spaced parallel horizontally disposed guide plates, means rigidly supporting said guide plates in the aforementioned relation, a horizontally extending support bar disposed between and below said guide plates, said support bar being fixedly secured to a hanger element pivoted on said means in such a manner as to allow said support bar to be selectively moved from between said guide plates, an abutment provided on said support bar near one end thereof and serving as a stop against which one end of a brake shoe may rest thereby providing a means for positioning a brake shoe on said support bar and between said guide plates, a follower arm pivoted at one end on said means and disposed between said guide plates, resilient means urging the end of said follower arm remote from the pivoted end downwardly toward said bar, and means operatively connected to said hanger for selectively moving said support bar to and away from its position beneath and between said guide plates.

27. In a brake shoe grinding machine, a loading device providing a chamber having a horizontally exposed opening for receiving brake shoes in successive order comprising a pair of horizontally disposed and spaced parallel guide members extending away from said opening, said guide members having facing surfaces formed to receive thereagainst in free sliding engagement a brake shoe delivered through said opening into said chamber, a relatively movable bottom for said chamber normally disposed below and between said guide members and having an upper surface which extends in the same direction away from said opening as said guide member surfaces, said upper surface being formed to slidingly receive therealong a brake shoe, an abutment provided on said upper surface at a point remote from said chamber opening, said abutment serving as a stop against which a brake shoe may be positioned, and means operatively connected to said bottom for alternatively positioning and withdrawing said bottom from its normal position beneath and between said guide members.

28. In a brake shoe grinding machine, a loading device providing a chamber having a horizontally exposed opening for receiving brake shoes in successive order comprising a pair of horizontally disposed and spaced parallel guide members extending away from said opening, said guide members having facing surfaces formed to receive thereagainst in free sliding engagement a brake shoe delivered through said opening into said chamber, a relatively movable bottom for said chamber normally disposed below and between said guide members and having an upper surface which extends in the same direction away from said opening as said guide member surfaces, said upper surface being formed to slidingly receive therealong a brake shoe, and an abutment means provided on said upper surface at a point remote from said chamber opening, said abutment serving as a stop against which a brake shoe may be positioned.

29. In a brake shoe grinding machine having a rotatable clamping drum adapted to support brake shoes thereon, a safety device associated with said drum, said device comprising a pivoted support, a member slidably mounted on said support for reciprocatory motion, a latch contactable with said member for holding the latter against movement in one direction with respect to said support, and a resilient means operatively connected to and interposed between said support and said member urging said member in said one direction, said support being pivotable in such a manner as to break the hold of said latch whereby said resilient means will force said member in said one direction, said breaking operation being effected by the contact of a brake shoe with the aforementioned reciprocable member during the operation of the machine.

30. In a brake shoe grinding machine, a conveyor mechanism comprising a conveyor bed having a surface adapted to have conveyed therealong a plurality of brake shoes, a conveyor chain positioned on said bed and arranged to run a predetermined distance parallel and adjacent to said surface; a loading device positioned opposite one end of said conveyor mechanism to receive therefrom brake shoes conveyed along said surface, said loading device defining a chamber having an opening for receiving brake shoes therethrough comprising lateral and bottom guide supports arranged relative to each other to form said chamber, a movable support operatively connected to said bottom and operable to alternately move said bottom to and from its normal position between said lateral guide supports whereby a brake shoe may be discharged from said chamber; and a rotatable clamping fixture supported directly beneath said bottom guide support and having two clamping jaws thereon, one of said jaws being movable into and out of clamping engagement with the other jaw, a reciprocable member carried by said fixture and being operatively connected to said one jaw in such a manner that the latter is capable of a wobbling movement, and a fluid pressure power means operatively connected to said reciprocable member for forceably moving said one jaw toward said other jaw.

ANTONIN KASAK.
ALFRED WESSTROM.

References Cited in the file of this patent

UNITED STATES PATENTS

| Number | Name | Date |
|---|---|---|
| 425,229 | Keith | Apr. 8, 1890 |
| 444,016 | Puetz | Jan. 6, 1891 |
| 777,295 | Marx | Dec. 13, 1904 |
| 954,090 | Goss | Apr. 5, 1910 |
| 954,091 | Goss | Apr. 5, 1910 |
| 1,050,791 | Beach | Jan. 21, 1913 |
| 1,230,967 | Whittelsey | June 26, 1917 |
| 1,358,255 | Seufer | Nov. 9, 1920 |
| 1,371,221 | Burke | Mar. 15, 1921 |
| 1,496,480 | Marshall | June 3, 1924 |
| 1,521,622 | Hathaway | Jan. 6, 1925 |
| 1,609,326 | Stuart | Dec. 7, 1926 |
| 1,613,330 | Prescott | Jan. 4, 1927 |
| 1,689,428 | Farmer | Oct. 30, 1928 |
| 1,770,650 | Levin | July 15, 1930 |
| 1,857,894 | Uline | May 10, 1932 |
| 1,913,089 | Rogers | June 6, 1933 |
| 1,952,130 | Harrison | Mar. 27, 1934 |
| 2,169,510 | Wool | Aug. 15, 1939 |
| 2,224,968 | Klocke | Dec. 17, 1940 |
| 2,331,953 | Andrews | Oct. 19, 1943 |
| 2,355,082 | Kearney | Aug. 8, 1944 |
| 2,421,957 | Mead | June 10, 1947 |
| 2,447,959 | Phillips | Aug. 24, 1948 |
| 2,491,268 | Kastel | Dec. 13, 1949 |
| 2,497,860 | Brown | Feb. 21, 1950 |

FOREIGN PATENTS

| Number | Country | Date |
|---|---|---|
| 95,518 | Austria | Jan. 10, 1924 |
| 259,709 | Great Britain | Oct. 21, 1926 |
| 78,180 | Sweden | Mar. 7, 1932 |
| 125,898 | Australia | Nov. 6, 1947 |